June 17, 1924. 1,498,348
E. R. BURTNETT
INTERNAL COMBUSTION ENGINE
Filed July 29, 1922   2 Sheets-Sheet 2
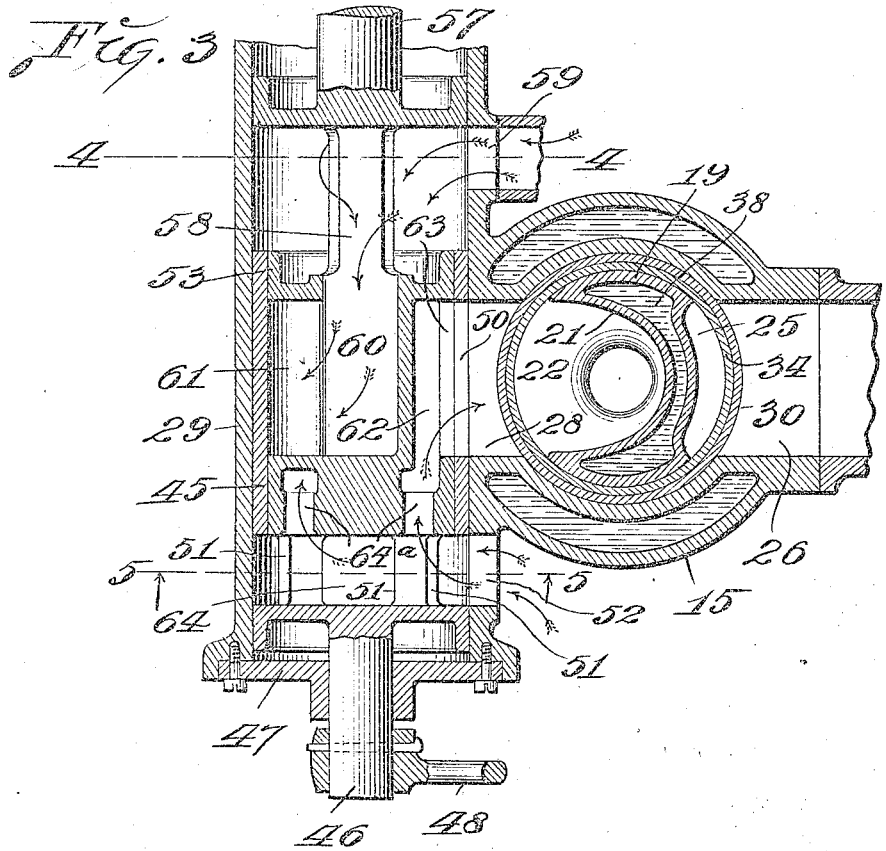
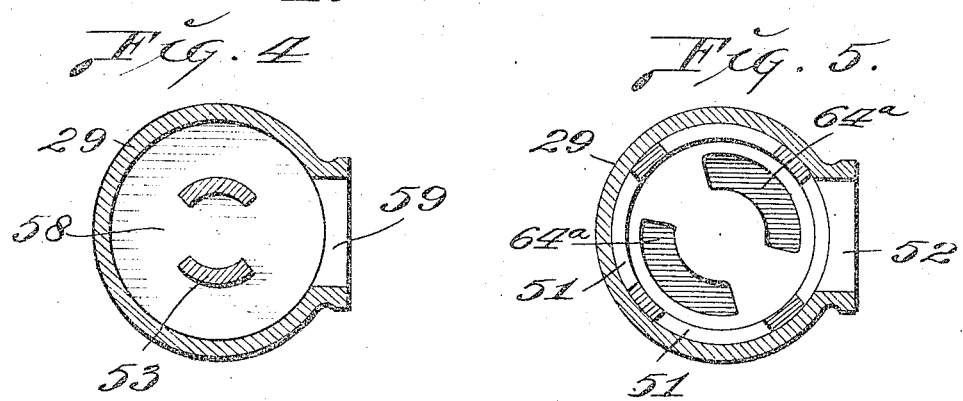
Inventor,
Everett R. Burtnett.
By Martin O. Smith, atty Patented June 17, 1924.

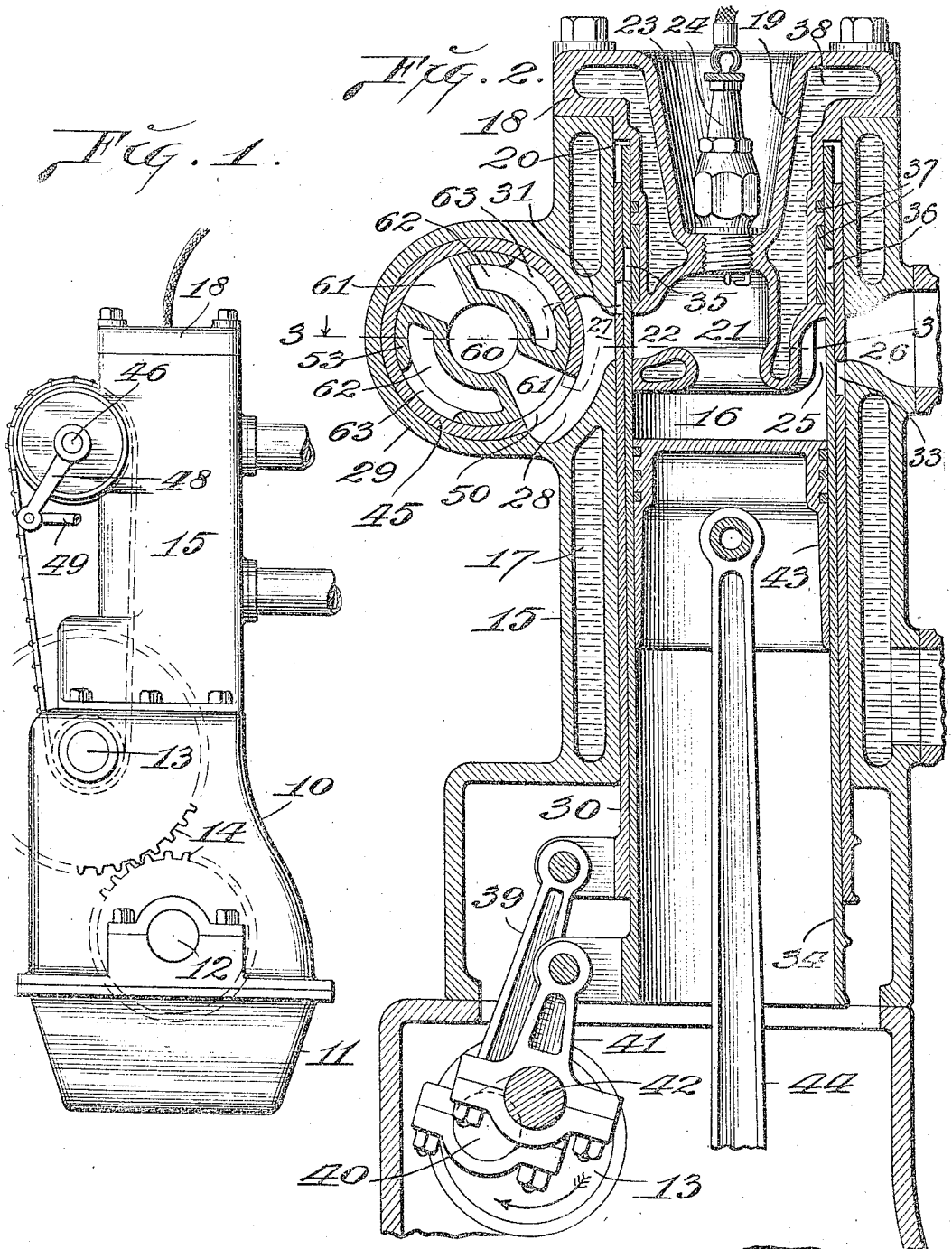

1,498,348

UNITED STATES PATENT OFFICE.

EVERETT R. BURTNETT, OF LOS ANGELES, CALIFORNIA, ASSIGNOR OF ONE-HALF TO CHARLES A. BURTNETT, OF LOS ANGELES, CALIFORNIA.

INTERNAL-COMBUSTION ENGINE.

Application filed July 29, 1922. Serial No. 578,284.

*To all whom it may concern:*

Be it known that I, EVERETT R. BURTNETT, a citizen of the United States, residing at Los Angeles, in the county of Los Angeles and State of California, have invented new and useful Improvements in Internal-Combustion Engines, of which the following is a specification.

My invention relates generally to internal combustion engines and more particularly to an engine of the sleeve valve type, the principal object of my invention being to combine with the engine, simple and efficient valve means for controlling the admission of inert air or cooled burnt products of combustion, and gaseous fuel into the combustion chamber of the engine and which inert air and gaseous fuel, together with the relatively small volume of products of combustion remaining in the combustion chamber at the termination of the previous exhaust stroke of the piston, are disposed in stratified relation, with the charge of gaseous fuel occupying a pocket that is formed in the underside of the cylinder head of the engine.

Further objects of my invention are to provide the cylinder head of the engine with a combined stratification and combustion pocket, the same having communication with a gaseous fuel and air inlet chamber through registering ports that are formed in the sleeves within the cylinder, to provide in the underside of the cylinder head a deflecting outlet port for the burnt products of combustion that discharge from the combustion chamber during the exhaust stroke of the piston and to provide for the ignition of the compressed combustible charge within the stratification pocket.

Further objects of my invention are to provide a rotary valve manifold, that operates in harmony with the inlet port means of the sleeves for controlling the admission of gaseous fuel and non-combustible charge volume to the combustion chamber of the engine, to associate with the rotary valve, a sleeve that cooperates with said valve in controlling the admission of gaseous fuel and inert charges to the combustion chamber, and which sleeve is adjustable in order to accurately control the variation of the ratio of inert volume and fuel mixture admitted to the cylinder during the suction or induction stroke of the piston and consequently producing an engine having the desirable attributes of constant volume and constant compression.

With the foregoing and other objects in view, my invention consists in certain novel features of construction and arrangement of parts, that will be hereinafter more fully described and claimed and illustrated in the accompanying drawings in which:

Fig. 1 is an end elevational view of an engine of my improved construction.

Fig. 2 is a vertical section taken through the center of one of the cylinders of the engine.

Fig. 3 is a horizontal section taken on the line 3—3 of Fig. 2.

Fig. 4 is a cross section on the line 4—4 of Fig. 3.

Fig. 5 is a cross section on the line 5—5 of Fig. 3.

Referring by numerals to the accompanying drawings 10 and 11 designate respectively the upper and lower parts of a crank case, the end walls of the upper part being formed with suitable bearings for a crank shaft 12.

A crank shaft 13 is journalled in suitable bearings in the upper portion 10 of the crank case, said crank shaft being for the puropse of driving the rotary and sleeve valves of the engine. This crank shaft is driven directly from shaft 12 by suitable gear connections 14 and the latter being arranged so as to drive said shaft 13 at half the speed of shaft 12.

Surmounting the upper part of the crank case is a cylinder block 15 having one or more piston chambers 16, the upper portions thereof constituting combustion chambers.

The wall of the block 15 surrounding each chamber 16 is provided with a chamber 17 through which is adapted to circulate a fluid cooling medium such as water.

Secured to the top of cylinder block 15 and closing the upper end of chamber 16 is a head 18 having a depending cylindrical portion 19 that projects a substantial distance downwardly into the chamber 16. The external diameter of this depending portion 19 is slightly less than the diameter of the chamber 16, thereby providing a relatively narrow annular space 20 between said depending portion and the adjacent face of chamber 16.

Formed in the lower portion of the depending member 19 is a pocket 21, the open lower end thereof communicating with chamber 16 and the upper portion of said pocket has communication with the annular space 20 by means of an inlet port 22 that curves slightly upwards from its outer towards its inner end.

The head 18 and depending portion 19 are formed with a recess or depression 23, and arranged therein and seated in the wall between the bottom thereof and the pocket 21 is a spark plug 24. The terminals of the electrodes of this plug are arranged in the upper portion of the chamber 21.

Formed in the outer face of the depending portion 19 of the head, at the lower end thereof and diametrically opposite to the port 22 is a short vertically disposed exhaust port or passageway 25, the upper end of which is a direct horizontal alignment with an exhaust port 26 that is formed through the wall of cylinder 15.

The outer end of the inlet port 22 is in direct horizontal alignment with exhaust port 26, the upper end of port 25 and also with a port 27 at the upper end of an arcuate inlet chamber 28 that is formed in the wall of cylinder 15. The arcuate chamber communicates with the chamber within a horizontally disposed cylindrical casing 29 and the latter being formed integral with cylinder 15.

Arranged for reciprocatory movement within chamber 16 and bearing directly against the inner face of the cylinder 15 is an open ended sleeve 30 that performs the functions of a valve and formed in said sleeve is a port 31, that is adapted to register with ports 27 and 22 as the sleeve is reciprocated.

Formed in the opposite side of sleeve 30 and in a plane slightly below that occupied by port 31 is a port 33 that is adapted to coincide with ports 25 and 26 as said sleeve is reciprocated.

Arranged for reciprocatory movement within sleeve 30 is a second sleeve valve 34, the upper portion of which encloses the depending portion 19 of head 18 and formed in said sleeve is a port 35 that is adapted to register with ports 22, 27 and 31. Formed in the opposite of sleeve 34 and in the same plane with port 35, is a port 36 that is adapted to register with ports 25, 26 and 33. The upper portion of the sleeve valves 30 and 34 occupy the annular space 20 between depending portion 19 of head 18 and the surrounding portion of cylinder 15 and to provide a fluid pressure tight joint between the inner sleeve and depending member 19 suitable packing rings 37 are seated in the periphery of said depending member directly above ports 22 and 25.

Head 18 and depending portion 19 are provided with communicating chambers 38 through which may be circulated a suitable fluid cooling medium.

The lower portions of sleeve 30 is connected by a pitman 39 to a crank 40 on shaft 13, and likewise the lower portion of sleeve 34 is connected by a pitman 41 to a crank 42 on said shaft 13, said crank 42 being approximately 90 degrees in advance of the crank 40, (see Fig. 2).

Arranged for reciprocatory movement within sleeve 34 is a piston 43 that is connected in the usual manner by a pitman 44 to crank shaft 12.

Arranged for rotary adjustment within casing 29 is a sleeve 45 provided at one end with an axially disposed stem 46 and the latter extending through a bearing that is formed at the center of a plate 47 that closes the end of said cylinder.

Secured at the outer end of stem 46 is a crank arm 48 to which is connected a manually operable rod 49.

Formed in sleeve 45 is a port 50 that is adapted to coincide with chamber 28. The width of this port 50 is substantially half that of the chamber 28 and in length said port and chamber are substantially equal.

The width of chamber 28 which constitutes the cylinder inlet port, is, in degrees, twice the distance of peripheral travel of a rotary valve selector (hereinafter more fully described) during one complete working stroke of the piston.

A relatively large chamber 58 between one end of valve 53 and the adjacent end of sleeve 45 is constantly in communication with gaseous fuel inlet port 59 in housing 29. Leading from this chamber 58 lengthwise through the center of the rotary valve is a duct 60, the inner end thereof communicating with the inner ends of a pair of radially arranged inlet ports 61. These ports are arranged diametrically opposite to each other and the width of the outer end of each port equals the width of port 50 in sleeve 45.

Formed in the central portion of the body of valve 53 is a pair of chambers 62, the members thereof being oppositely disposed with respect to each other and located between the ports 61. The chambers are adapted to alternately register with port 50 in sleeve 45 by means of ports 63 that are formed in the outer wall of the valve body and the width of each port 63 is substantially equal to the width of said port 50.

Chambers 62 have communication with a large chamber 64 in the end of the sleeve 45 through ports 64ª that are formed in the corresponding end of the rotary valve and said large chamber receives the inert volume charge through the inlet ports 51 and 52.

The operation of my improved engine is as follows:

As illustrated in Fig. 2, the piston is at its

"high center" or at the end of its compression stroke. The inlet and exhaust ports in the sleeve valves are "closed" and a compressed charge of products of combustion, inert air or cooled products of combustion and gaseous fuel occupies chamber 16, above the piston and within pocket 21, and with the parts of said charge in stratified relation.

As the piston passes high center, a spark is produced between the terminals of the electrodes of plug 24 thereby igniting the gaseous fuel portion of the charge and the force of the expansion resulting from combustion is directed onto piston 43 to move the same downward on its power stroke.

During this action, crank 40 and pitman 39 move sleeve valve 30 upwardly, and crank 42 and pitman 41 move sleeve valve 34 downwardly so that during the succeeding upward movement or exhaust stroke of the piston, ports 33 and 36 are in register with each other and with port 26 thereby permitting the greater portion of the products of combustion to escape through duct 25 and said ports 36, 33 and 26.

At the end of the exhaust stroke, the ports 33 and 36 pass out of registration with each other and with port 26, and at the beginning of the succeeding or suction stroke of the piston, there remains within chamber 16 and pocket 21, a relatively small volume of burnt gases or products of combustion.

At the beginning of the suction stroke, inlet ports 31 and 35 are beginning to register with each other and with ports 22 and 27 and one of the ports 63 in the rotary valve is beginning to register with inlet port 50. The registration of the ports just mentioned continues during all or the greater portion of the suction stroke of the piston, depending of course, upon the relative position of port 50 in the manually adjustable sleeve 45, and thus for a predetermined time interval, during the first portion of the downward travel of the piston on its suction stroke, inert air or cooled products of combustion from a suitable container, will be drawn through port 52, ports 51, chamber 64, port 64ª, chamber 62, ports 63 and 50 into chamber 28 and from thence through ports 27, 31, 35 and 22 into pocket 21.

The inert volume thus admitted, drives the burnt gases remaining in pocket 21, before it, downwardly into chamber 16, and simultaneously with the passage of port 63 out of registration with port 50, the succeeding port 61 registers with said port 50 and, during the remainder of the downward travel of the piston, gaseous fuel will be drawn into the pocket 21, through port 59 in casing 29, chamber 58, chamber 60, ports 61 and 50 into chamber 28 and from thence through ports 27, 31 and 22.

The charge of gaseous fuel thus drawn into pocket 21 will drive before it, the volume of inert air that lies above the volume of burnt products of combustion and on the succeeding upward stroke of the piston, the entire volume within the piston clearance chamber and pocket 21 will be compressed in the upper portion of chamber 16 and said pocket, with a strata of burnt products of combustion immediately adjacent to the head of the piston, a strata of inert air or cooled products of combustion above said strata of burnt products of combustion and with a strata of gaseous fuel in the upper portion of pocket 21.

Rotary adjustment of sleeve 53 enables ports 61 and 63 to register with port 50 at any desired point throughout the length of the chamber 28 and in the desired and proper time relation to the travel of the piston within the cylinder, as well as in harmony with the registration of the inlet ports of the sleeve valves.

Thus my improved construction provides simple and efficient means for throttling the engine by controlling, as desired, the variation of the ratio of volume of the gaseous charge last admitted to the cylinder, to the volume of the first admitted inert charge and the construction being such that both volumes enter the same inlet port with one volume admitted at a time and with the fuel volume immediately succeeding the inert volume.

Such arrangement together with the stratification of the entire volume taken into the combustion chamber produces an engine that is of relatively high efficiency and of decided economy in operation.

Obviously the details of construction of my improved engine may be varied slightly without departing from the spirit of my invention, the scope of which is set forth in the appended claims.

I claim as my invention:

1. The combination with an internal combustion engine having sleeve valves that are provided with inlet and exhaust ports, of a rotary valve selector and a sleeve enclosing the same, said rotary valve and sleeve having co-operating ports that are adapted to co-operate with the inlet ports in the sleeve for controlling the admission of inert air and gaseous fuel into the combustion chamber of the engine.

2. The combination with an internal combustion engine having sleeve valves that are provided with inlet and exhaust ports, of a rotary valve selector and sleeve enclosing the same, said rotary valve and sleeve having co-operating ports that are adapted to co-operate with the inlet ports in the sleeve for controlling the admission of inert air and gaseous fuel into the combustion chamber of the engine and said sleeve being adjustable in order to vary the volumes and admission periodicities of said air and gaseous fuel.

3. The combination with an internal combustion engine having an inlet port, of a rotatively adjustable member having a port that is adapted to register with said inlet port and a rotary valve arranged for operation with said rotary member and having inert volume charge and gaseous fuel inlet ports that are adapted to register with the port in said rotatively adjustable member.

4. The combination with an internal combustion engine having an inlet port, of a member having a port that is adapted to register with said inlet port, a rotary valve arranged for operation within said member and having inert volume charge and gaseous fuel inlet ports that are adapted to register with the port in said member and means for adjusting said member so as to vary the admission of the inert volume and gaseous fuel charges to the inlet port in the engine cylinder.

5. In an internal combustion engine having an inlet port, and adjustable sleeve and a rotary valve having co-operating ports that are adapted to register with said inlet port for the admission of inert charge volume and gaseous fuel charges into the combustion chamber within the engine cylinder and the width of said inlet opening being twice the degrees of peripheral movement of the rotary valve during one working stroke of the piston of the engine.

6. In an internal combustion engine having an inlet port, an adjustable sleeve having a port that is adapted to register with said inlet port, and a rotary valve within said sleeve, which valve is provided with pairs of inert volume and gaseous fuel inlet ports that are adapted to register with the port in said sleeve.

In testimony whereof I have signed my name to this specification.

EVERETT R. BURTNETT.